United States Patent [19]

Alain

[11] Patent Number: 5,579,805
[45] Date of Patent: Dec. 3, 1996

[54] VALVE ASSEMBLY FOR A STEAM-DISTRIBUTION INSTALLATION IN WHICH THE CONDENSATES ARE RETURNED

[76] Inventor: Jean-Claude Cruchet Alain, 721 Petite Rue du Val aux Clercs 76400, Fecam, France

[21] Appl. No.: 489,084

[22] Filed: Jun. 9, 1995

[51] Int. Cl.$^6$ ....................................... F16K 11/22
[52] U.S. Cl. .................. 137/606; 137/614.11; 137/886
[58] Field of Search ........................ 137/606, 614.11, 137/886

[56] References Cited

U.S. PATENT DOCUMENTS 3,822,722  7/1974  Romanelli ............................ 137/886

Primary Examiner—Gerald A. Michalsky
Attorney, Agent, or Firm—Jones & Askew

[57] ABSTRACT

An assembly comprising a principal duct on which there are connected, laterally, several ducts for the return of the condensates, each duct comprising two valves separated by a separator, the assembly being characterised in that the principal duct (11) comprises, laterally, several secondary ducts (10) forming at least one coplanar group (B-C) of secondary ducts; in that the manoeuvering rods (13) of the two valves are disposed in alignment in each secondary duct (10); and in that each secondary duct is provided with two lateral connections (17$_2$, 20), one for a separator (15), the other for the duct (16) for returning the condensates, these two lateral connections being disposed on the same side of the arrangement comprising the coplanar group (B-C) of secondary ducts.

6 Claims, 3 Drawing Sheets

VALVE ASSEMBLY FOR A STEAM-DISTRIBUTION INSTALLATION IN WHICH THE CONDENSATES ARE RETURNED

Installations known as "tracing" installations (see FIG. 1) are used to reheat, or to maintain the temperature of, liquids circulating in the ducts 1 and, in particular, in the ducts 1 of chemical and petrochemical units. These installations comprise steam circulation ducts 2, which are disposed in the immediate proximity of the ducts 1 to be reheated and which are connected at their ends to valve assemblies known as "clarinets", of which one, 3, is intended to supply the steam and the other, 4, to return the condensates.

Each clarinet consists of a principal duct 5 to which there are connected, laterally, several of these reheating ducts 2, the clarinet 3 for supplying steam comprising a valve 6 on each reheating duct, which valve is for the outlet of steam, whereas the clarinet 4 for returning the condensate comprises two valves 7–8 disposed in succession along each duct 2 on both sides of a separator 9 which performs the steam/water separation. The separated condensation water is subsequently returned by means of the principal duct 5 of the clarinet 4 to a collector, and then to the boiler which produces the steam.

The clarinets 3 which supply the steam do not pose a major problem regarding either the space used or the safety, given that they are provided with only one valve 6 per steam supply duct 2, and that they only require very little maintenance. On the other hand, these problems do arise in relation to the clarinet 4 for returning the condensates, particularly since each clarinet separates into several stages (see FIG. 1), each comprising, in general, two ducts 2 for returning the condensates, the ducts of these various stages being, in this case, disposed in two coplanar groups each comprising the separator 9 on the one side and the handles of the valves 7–8 on the other side. In this manner, valve assemblies are obtained which are bulky and which comprise a large number of connections and the separators of which are difficult to access for the purposes of mounting and dismounting them, insofar as if the handles of the valves 7–8 are disposed in front of the ducts 2 for returning water/steam to permit the manoeuvering thereof, the separators 9 are, themselves, necessarily disposed behind these ducts, this being with the object of reducing the bulkiness along each duct 2.

Furthermore, it has been possible to establish the presence of a significant risk of accidents during maintenance work on these installations in that the workman performing the dismounting of the separators may either forget to close one of the valves of the duct on which the dismounting is being performed, or may close it badly. Likewise, when restarting operation, the workman may forget to open one of the valves, or open it insufficiently, from which there results an absence of reheating or an insufficient heating with all the major problems that this may involve in the ducts 1 to be heated.

The object of the present invention is, in particular, to overcome these disadvantages and, to this end, it relates to a valve assembly for steam-distribution installations in which the condensates are returned, comprising a principal duct to which there are connected, laterally, several ducts for returning the condensates, each duct comprising two valves separated by a separator, the assembly being characterised in that the principal duct comprises, laterally, several secondary ducts forming at least one coplanar group of secondary ducts, in that the maneuvering rods of the two valves are disposed in axial alignment in each secondary duct and in that each secondary duct is provided with two lateral connections, one for a separator, the other for the duct for returning the condensates, these two lateral connections being disposed on the same side of the arrangement comprising the coplanar group of secondary ducts.

According to a further characteristic of the invention, the aligned maneuvering rods of two valves of the same secondary duct are integral with one another.

According to a further feature of the invention, the maneuvering rods which are integral with one another are produced by ensuring that the two valves are opened or closed practically simultaneously.

The invention is shown by way of nonlimiting example in the drawings attached hereto, in which.

The object of the invention is, in consequence, to produce a clarinet for returning the condensate, which is less bulky, is simple to mount and is easily accessible both as regards the valve and as regards the separators, this installation furthermore permitting the risks of accidents to the maintenance personnel to be reduced and the risks of an operational fault of the reheating installation to be reduced.

The clarinet shown by way of example on the attached drawings comprises n stages each of which is provided with two secondary ducts 10 which open laterally into the principal duct 11 and forming, between them, an acute angle A of approximately 20°.

In practice, the angle of the two secondary ducts will be between 0° and 60° and will be determined, taking into consideration the length of these secondary ducts 10 and the diameter of the maneuvering handles 12 of the valves, such that the handles will be adjacent one another while still being able to be moved easily.

These secondary ducts of different stages form, together, two coplanar groups B and C of ducts 10 which are parallel to one another and perpendicular to the axis X—X of the principal duct 11.

Figure 1:
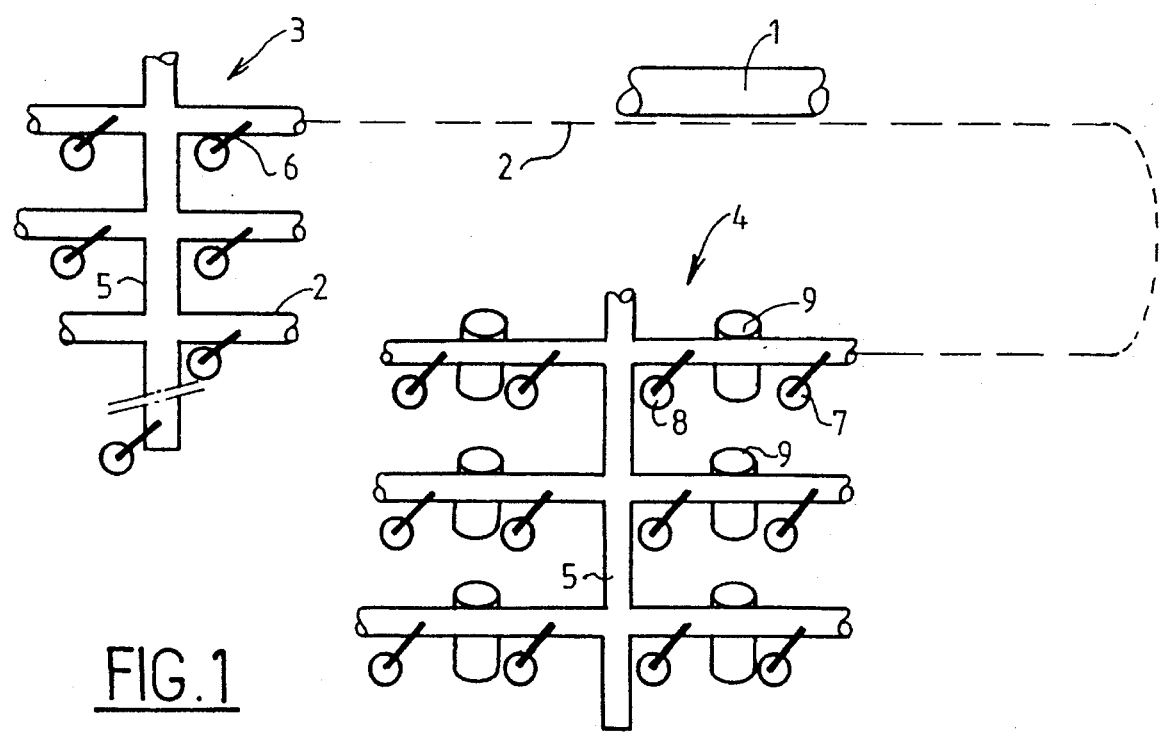
FIG. 1 is a perspective view of a known tracing installation.
Figure 2:
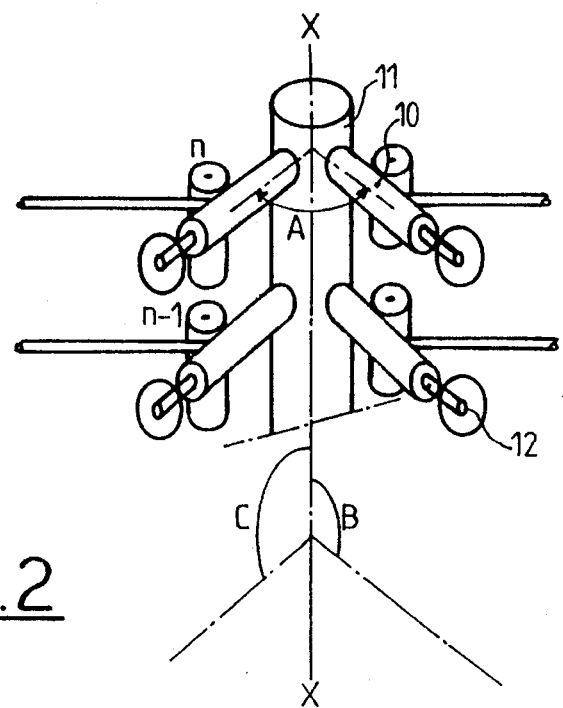
FIG. 2 is a perspective view of a clarinet for returning the condensates, according to the invention.
Figure 3:
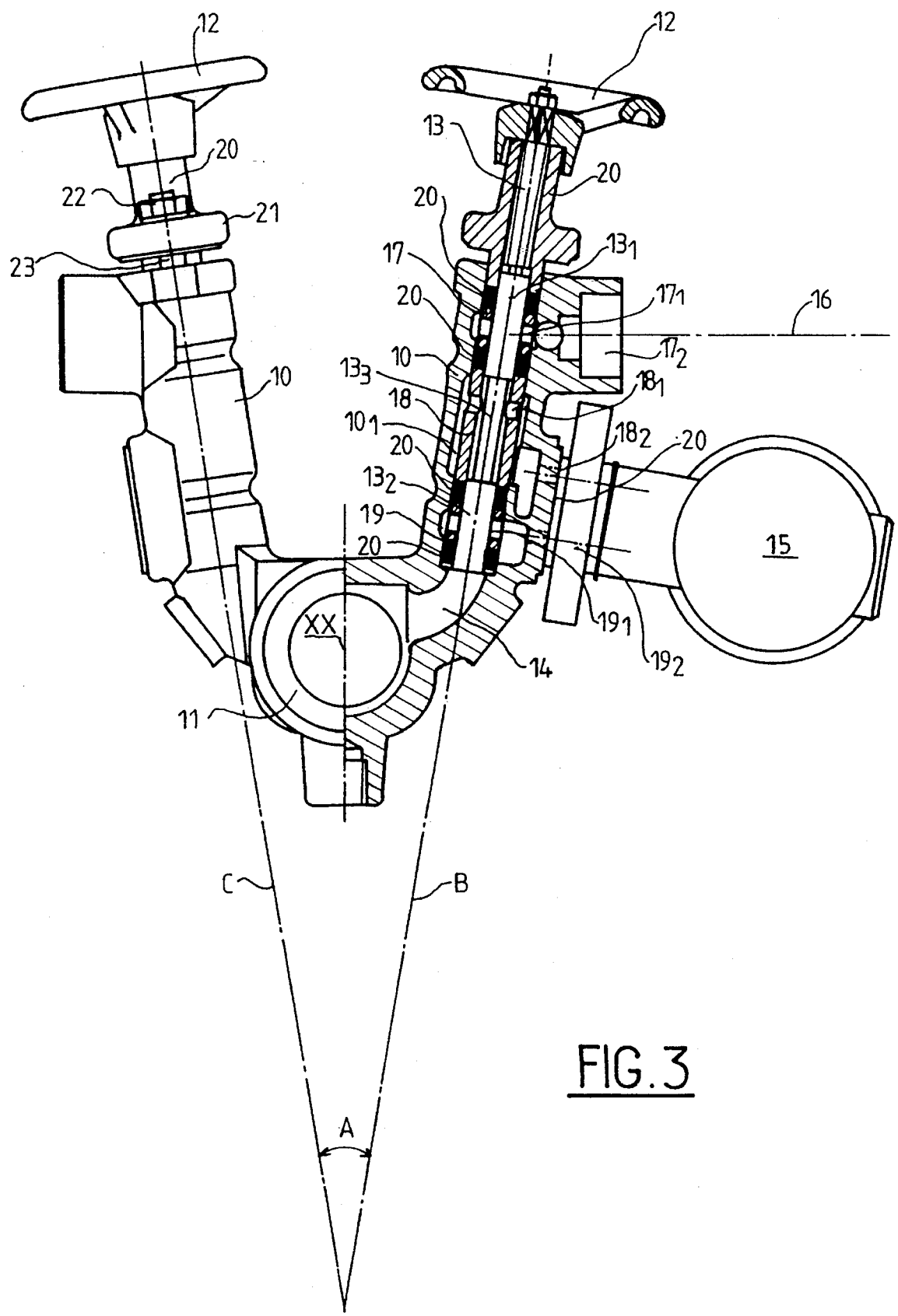
FIG. 3 is a transverse half-section of the clarinet shown in FIG. 2, this section being taken at the level of a secondary duct.

Each secondary duct 10 constitutes the body of the valve for the maneuvering rods 13 of the two valves (see FIG. 3), these rods being aligned and disposed axially to the aperture of the duct in question.

According to the example shown, the two rods 13 of the two valves are integral with one another and are thus actuated by one same handle 12.

The handles 12 of the valves of each stage are thus disposed at a slight distance from one another and substantially parallel taking into consideration the small acute angle A formed by the secondary ducts.

In the example shown, the easy mounting and access are further improved by the formation of an elbow 14 at the base of each secondary duct at the junction thereof with the principal duct 11, it thus being possible for the angle A to be of the order of from 10° to 30° as a function of the radius of curvature and the angle covered by the two elbows of each stage.

Separators 15 and ducts 16 for returning condensates, in which ducts the steam/water mixture circulates, are mounted on this assembly, the bulkiness of which is reduced.

To this end, each secondary duct 10 forming the body of the two valves comprises, laterally, at the exterior of the angle A, a connection device for a separator 15 and a connection device for a duct 16 for returning the condensates. These connection for 15 and 16 are thus disposed, for each group of valves, on the same side in relation to the coplanar arrangement B, C, of the secondary ducts 10 and of the valve thereof.

The operations of mounting and dismounting the separator for the maintenance thereof are likewise greatly simplified insofar as the separator 15 is located on the same side in relation to the rod 13 of the two valves and not between the two rods, and insofar as the axis of mounting thereof is substantially parallel to the axis of the shaft for returning steam/water and is not perpendicular.

This valve assembly may thus, in particular, be placed against a wall without the operations of mounting and dismounting being hampered.

Figure 4:
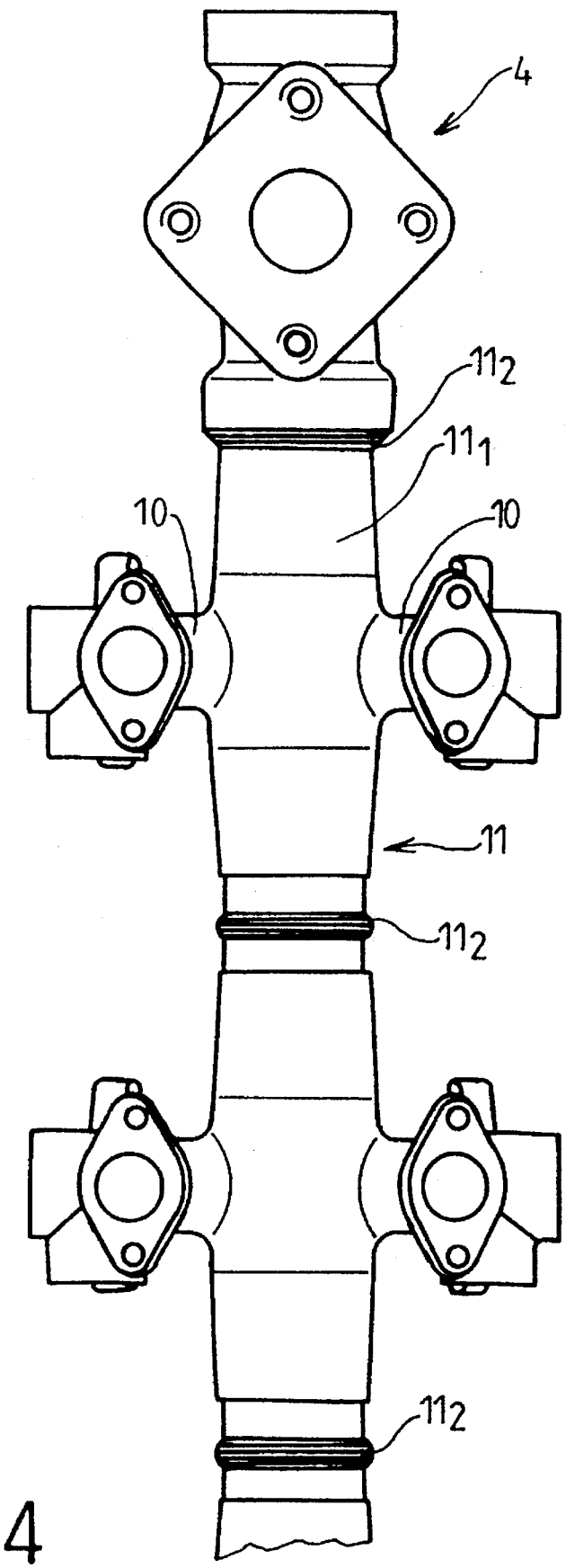
FIG. 4 is a lateral view of the clarinet for returning the condensates shown in FIG. 3.

In this construction, the secondary ducts 10 of each stage forming the body of the valves may advantageously be produced, using a casting process, in a single and integral part with a portion $11_1$ of the principal duct 11, as is shown in FIG. 4, the different portions subsequently being connected by a weld designated $11_2$ to form a clarinet for returning the condensates 4 according to the invention.

By rendering this production of the various stages of the clarinet for returning the condensate as one piece possible, the arrangement according to the invention permits the connections for the mounting to be reduced considerably, since the separators, ducts and valves are mounted directly on the bodies $11_1$ of each stage.

The manuvering rods 13 of the two valves, which rods are aligned and integral with one another, are disposed in an axially movable manner in the inside of a lantern which is mounted coaxial to the aperture of each secondary duct 10. This common rod for the two valves comprises a threaded end which screws into a cap 20 with a flange 21 secured at the end of the secondary duct 10 by nuts 22 which clamp on bolts 23.

The common rod 13 of the two valves has two cylindrical sealing zones $13_1$, $13_2$, which have a circular section and are connected by a zone $13_3$ of smaller diameter. This rod is mounted in a movable manner inside the lantern which divides axially and successively into a first, a second and a third section 17, 18, 19 separated by upper and lower annular sealing joints 20.

Each section comprises a lateral aperture $17_1$, $18_1$, $19_1$, the first of which communicates with a machined aperture $17_2$ constituting the connection means for the duct 16 for returning the water/steam mixture.

The apertures $18_1$, $19_1$ of the two other sections 18, 19 of the lantern communicate with transverse apertures $18_2$, $19_2$ which open out onto a flat surface 20 constituting the connection means of the separator 15 which is secured by means of screws or nuts (not shown).

At the level of the second section 18 of the lantern, the body has an elongated slot $10_1$ providing the connection between the aperture $18_1$ and the aperture $18_2$, this aperture being disposed, taking into account the length of the slot, in such a manner that this lateral aperture $18_1$ of the second section 18 is closer to the aperture $17_1$ of the first section than to the aperture $19_1$ of the third section. The length of the central part $13_3$ of the rod, which part is of a reduced diameter, is, furthermore, such that when the two valves are in the open position, it connects the apertures $17_1$, $18_1$ whilst sealing the apertures $18_1$ and $19_1$, the aperture $19_1$ opening out into the principal duct 11 in such a manner as to permit the connection of the duct 16 for returning condensates 16 and the principal duct 11 by means of a separator 15.

This arrangement is, furthermore, formed such that the rod 13 of the two combined valves performs the opening or closing thereof in a simultaneous manner.

I claim:

1. Valve assembly for a steam-distribution installation in which condensates are returned, comprising a principal duct to which there are connected, laterally, several ducts for returning the condensates, each duct comprising two valves which are separated by a separator, the assembly being characterised in that the principal duct (11) comprises, laterally, several secondary ducts (10) forming at least one coplanar group (B-C) of secondary ducts; and that maneuvering rods (13) of the two valves are disposed in alignment in each secondary duct (10) and in that each secondary duct is provided with two lateral connections ($17_2$, 20), one for the separator (15), and the other for the duct (16) for returning condensates, these two lateral connections being disposed on the same side of the arrangement comprising the coplanar group (B-C) of second ducts.

2. Assembly according to claim 1, characterised in that the aligned maneuvering rods (13) of the two valves of the same secondary duct are integral with one another.

3. Assembly according to claim 2, characterised in that the maneuvering rods (13), which are integral with one another, are formed so as to perform the opening or closing of the two valves practically simultaneously.

4. Assembly according to claim 1, characterised in that the principal duct (11) comprises two coplanar groups (B-C) of secondary ducts (10) forming, between them, at most an acute angle of 60°.

5. Assembly according to claim 1, characterised in that the connections of the separators (15), and the ducts (16) for returning the condensates, are located at the exterior of an angle (A) delimited by two coplanar groups (B-C) of secondary ducts (10).

6. Assembly according to claim 1, characterised in that the maneuvering rods (13) of the two valves of each secondary duct (10) are arranged so as to be axially movable in the interior of a lantern which is divided axially and successively into a first, a second and a third section (17, 18, 19), each section comprising a lateral aperture ($17_1$, $18_1$, $19_1$) the first of which communicates with the connection ($17_2$) for the duct (16) for returning the condensate, and the other two ($18_1$, $19_1$) of which communicate with the connection for the separator (15), the second section (18) forming, at the exterior and with the secondary duct, an elongated slot ($10_1$), the lateral aperture ($18_1$) of this second section (18) of the lantern being closer to the aperture ($17_1$) of the first section (17) than to the aperture ($19_1$) of the third section (19).

* * * * *